United States Patent [19]

Slomma

[11] 4,386,572

[45] Jun. 7, 1983

[54] DEVICE FOR DISPLACING THE COLOR-CHANGE CARRIAGE ON MULTIPLE-HEAD EMBROIDERY MACHINES

[75] Inventor: Heinz-Georg Slomma, Viersen, Fed. Rep. of Germany

[73] Assignee: Maschinenfabrik Carl Zangs Aktiengesellschaft, Krefeld, Fed. Rep. of Germany

[21] Appl. No.: 301,062

[22] Filed: Sep. 11, 1981

[30] Foreign Application Priority Data

Sep. 22, 1980 [DE] Fed. Rep. of Germany ....... 3035704

[51] Int. Cl.³ .............................................. D05C 3/02
[52] U.S. Cl. ..................................... 112/98; 112/163; 112/221
[58] Field of Search ............... 112/221, 155, 163, 167, 112/98

[56] References Cited

U.S. PATENT DOCUMENTS 4,054,098 10/1977 Hoeuer ................................. 112/221
4,276,838 7/1981 Bolldorf ............................... 112/221
4,301,756 11/1981 Teetz et al. .......................... 112/221

Primary Examiner—Ronald Feldbaum
Attorney, Agent, or Firm—Martin A. Farber

[57] ABSTRACT

The present invention relates to a device for displacing the color-change carriage on multiple-head embroidery machines having a plurality of embroidery needles per head which can be coupled alternatively with the needle bar drive for change in color or thread, the needle bar carriers of all embroidery heads being laterally displaceable jointly by a displacement bar which is connected with the color-change carriage. In order to create a dependably operating as well as easily mounted displacement device with the use of only a few individual parts, a control bar (10) which is provided in rack-like manner with incisions (10a) is arranged on the color-change carriage (6), a crank pin (11) driven by a servomotor engaging in said incisions (10a) and upon its engagement in an incision (10a) swinging a locking lever (12) on which there is arranged a locking member (14) which cooperates with the incisions (10a) and, via the control bar (10) positions the color-change carriage (6) in its corresponding position. The incisions (10a) for the crank pin (11) and for the locking member (14) can be of identical development and be provided with funnel-shaped bevels (10b).

9 Claims, 7 Drawing Figures

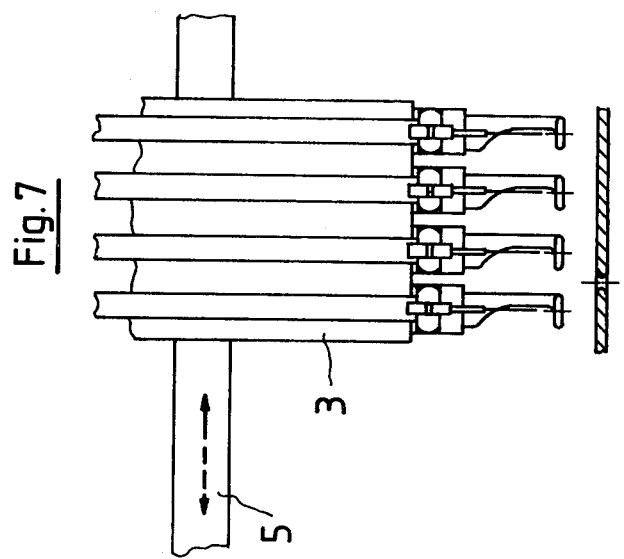
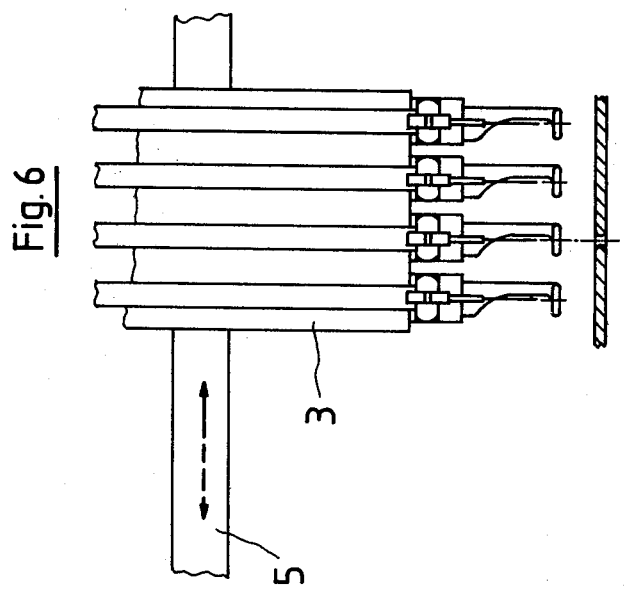

DEVICE FOR DISPLACING THE COLOR-CHANGE CARRIAGE ON MULTIPLE-HEAD EMBROIDERY MACHINES

The present invention relates to a device for displacing the color-change carriage on multiple-head embroidery machines having in each case a plurality of embroidery needles per head which can be coupled optionally with the needle-bar drive for a change in color or thread, the needle-bar carriers of all embroidery heads being laterally displaceable jointly by a displacement bar which is connected with the color-change carriage.

Multiple-head embroidery machines having a plurality of embroidery needles per head are known in which the embroidery needles are supported via their needle bars alongside of each other in a needle-bar carrier. The needle-bar carriers of all embroidery heads are supported in laterally displaceable manner in the embroidery head so that in each case only one needle bar per embroidery head is coupled with the needle-bar drive. In order to change to threads of different material, dimensions or color the needle-bar carriers of all embroidery heads are displaced laterally in common by a color-change carriage which is connected by a displacement bar with the needle-bar carriers. Aside from a lateral movement of displacement of the color-change carriage and thus of the needle-bar carriers it is necessary in this connection for these parts to assume and retain an exact position in each operating position so that a proper coupling between the specific needle bars selected and the needle bar drives of each embroidery head is assured.

In the known devices of the above-described type, the lateral movement of displacement and the positioning of the color-change carriage is effected by a Maltese cross, gearwheel, rack and a locking lever which is actuated via a cam independently of the Maltese cross. These parts are not only numerous and therefore expensive to manufacture but also require precise adjustment with respect to each other. Defective adjustment or a displacement of the mutual positions can lead to disturbances in operation and damage.

The object of the present invention is to create a device made of only a few individual parts for displacing the color-change carriage on multiple-head embroidery machines of the above-described type, which device is not only simpler to manufacture and mount than the known embodiments but also prevents disturbances in operation.

This object is aided in accordance with the invention in the manner that a rack-like control bar (10) provided with incisions (10a) is arranged on the color change carriage (6), a crank pin (11) driven by a servomotor engaging into said incisions (10a), the crank pin, upon its engagement (10a) in one incision (10a) swinging a locking lever (12) on which there is arranged a locking member (14) which cooperates with the incisions (10a) and, via the control bar (10), positions the color-change carriage (6) in its specific desired position.

The displacement device of the invention, which is made of the control bar driven by the crank pin and of the locking lever provided with the locking member, not only is of simple construction and reliable operation but, in addition makes any adjustment work between the parts which effect the lateral displacement of the color change carriage and the parts which fix its instantaneous position superfluous since both the crank pin and the locking member engage into the incisions of the control bar. Despite considerably simplified construction there is thus obtained a substantially greater reliability in operation on the part of the displacement device of the invention, which furthermore takes up considerably less space.

In accordance with another feature of the invention, the incisions (10a) for the crank pin (11) and for the locking member (14) are of identical development so that the control bar can also be produced in simple manner, for instance by stamping. The incisions (10a) are preferably provided with funnel-shaped bevelings (10b) which facilitate the engagement on the one hand of the crank pin and on the other hand of the locking member.

In one preferred embodiment of the invention, the locking member (14) is formed as a bolt which by means of the bevelings (10b) effects, in addition to an exact determination of the position of the control bar (10), also a self-locking against unintended displacement.

The locking lever is developed in accordance with the invention as a double-armed lever and is acted on by a spring (15) which pulls the locking member (14) into the corresponding incision (10a).

It is finally proposed by the invention to control the servomotor (16) which drives the crank pin (11) as a function of the program of the embroidery machine so that the entire course of operation can be effected completely automatically.

With the above and other objects and advantages in view, the present invention will become more clearly understood in connection with the detailed description of a preferred embodiment, when considered with the accompanying drawings, of which:

FIGS. 6 and 7 are front views of the needle bar assembly.

Figure 1:
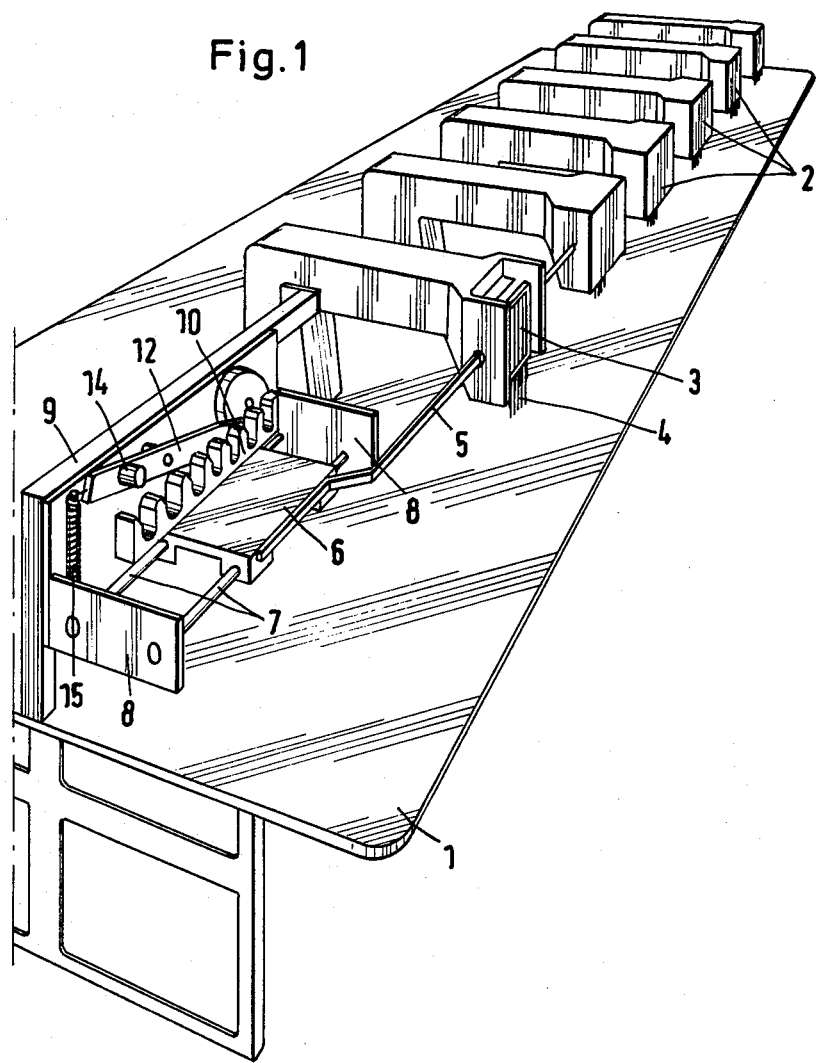
FIG. 1 is an overall perspective view of a multi-head embroidery machine having the displacement device in accordance with the invention.

The diagrammatic view of FIG. 1 shows a multi-head embroidery machine, on the table 1 of which there are arranged a total of six embroidery heads 2. In each embroidery head 2 there is a needle-bar carrier 3, each of which has four embroidery needles 4, of which at a time only one needle 4 is driven. The respectively driven embroidery needle 4 can be coupled via its needle bar with a needle-bar drive arranged in the embroidery head 2. In order to change the embroidery needle 4 which is being driven at the time, the needle-bar carriers of all embroidery heads 2 can be displaced laterally together.

Figure 2:
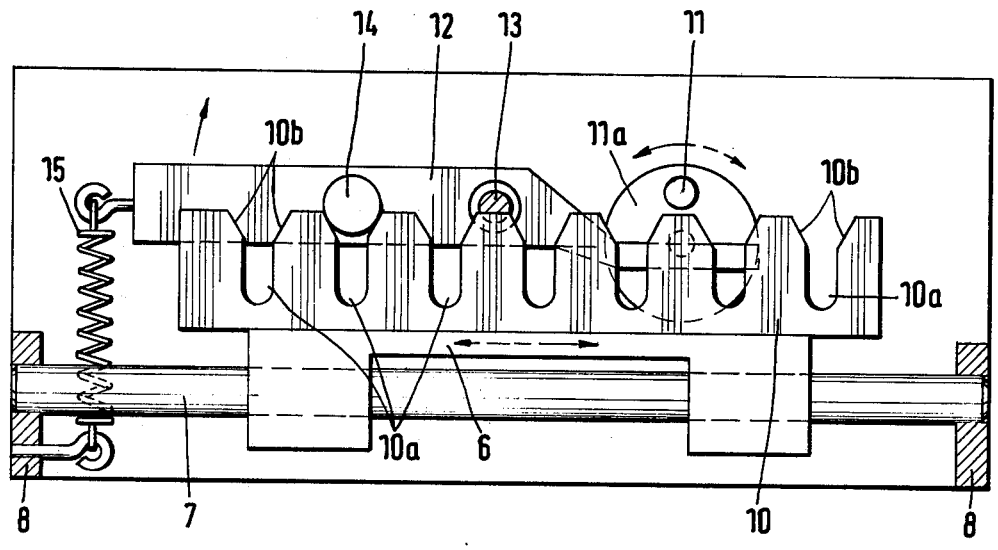
FIG. 2 is a front view of the displacement device showing the positioned color-change carriage.
Figure 3:
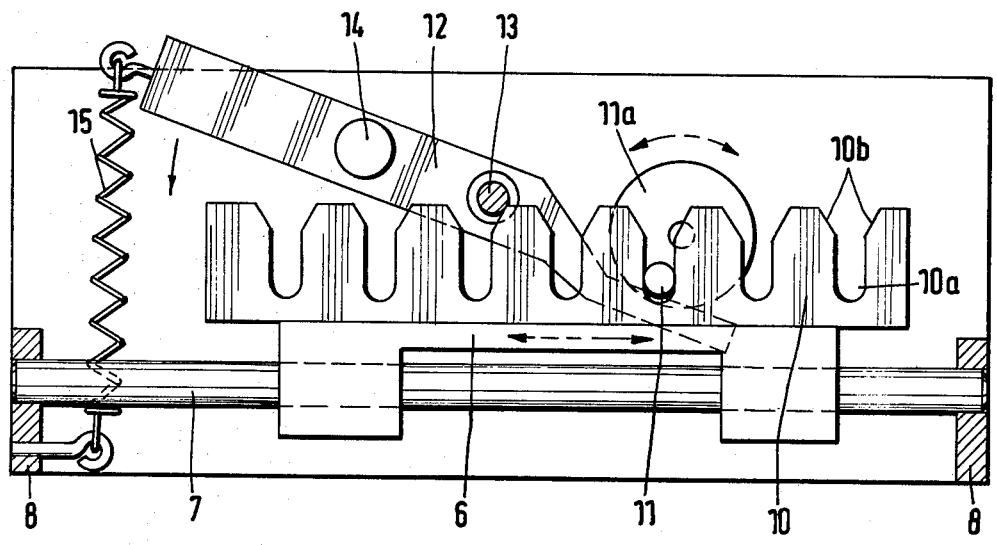
FIG. 3 is a view corresponding to FIG. 2 during the displacement movement of the color-change carriage.
Figure 4:
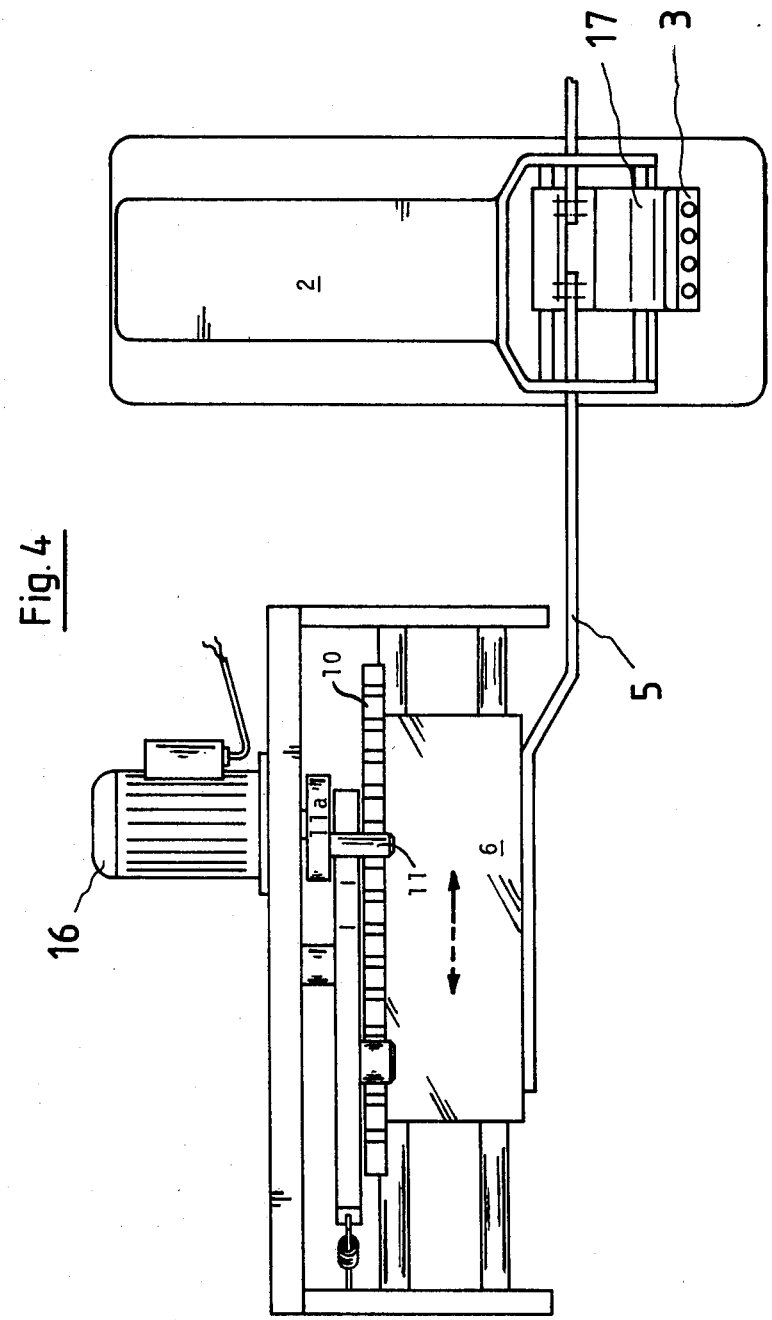
FIG. 4 is a top view of the color change displacement device.
Figure 5:
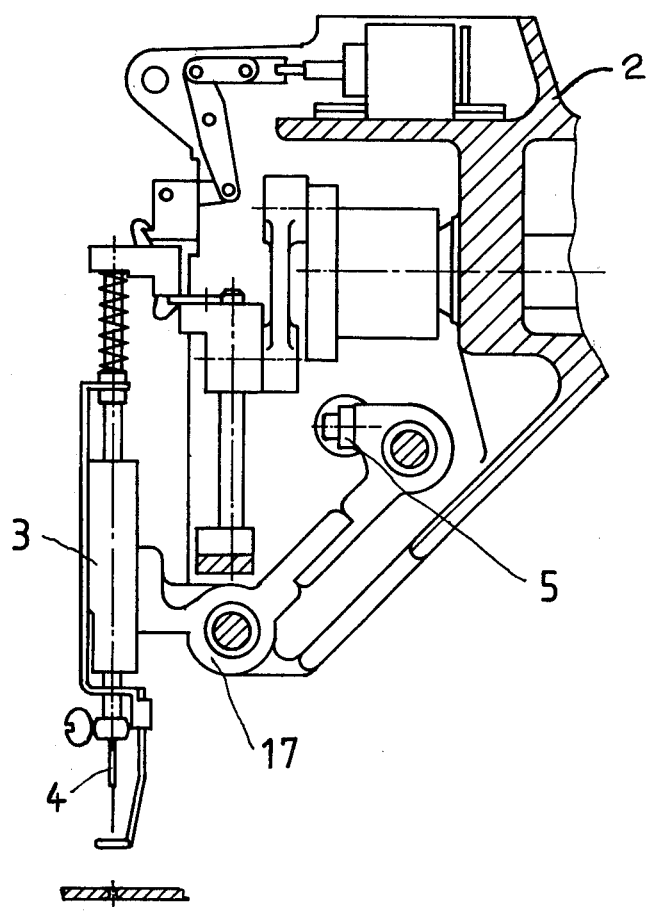
FIG. 5 is a side view of the needle bar assembly.

This lateral displacement of the needle-bar carriers 3 is effected via a displacement bar 5 from a color-change carriage 6 which is arranged in FIG. 1 on the left alongside the embroidery heads 2 above the table 1 and can be seen on a larger scale in the front view of FIGS. 2 and 3.

In the embodiment shown by way of example the color-change carriage 6 is guided displaceably on two guide bars 7 which are arranged between two carrier plates 8. The carrier plates 8 are fastened to an auxiliary frame 9 which is arranged for instance as an extension of the feet of the embroidery heads 2 on the table 1.

On the color-change carriage 6 there is arranged a control bar 10 which is provided in rack-like manner with incisions 10a. Each incision 10a has funnel-shaped bevels 10b, as can best be noted from FIGS. 2 and 3.

For the lateral displacement of the color-change carriage 6 a crank pin 11 engages into the incisions 10a of the control bar 10, the crank pin being fastened, in the embodiment shown, to a disk 11a and being driven by a servomotor 16 controlled by the embroidery program.

The rotary movement of the disk 11a indicated by a double-ended arrow in FIGS. 2 and 3 results, due to the engagement of the crank pin 11 into in each case one incision 10a of the control bar 10, in a movement of displacement of the color-change carriage 6 on its guide rods 7, as is also indicated by a double-ended arrow on the color-change carriage 6.

When the crank pin 11 dips into one of the incisions 10a of the control bar 10—as is shown in FIG. 3—it swings a locking lever 12 which is developed as a double-armed lever and is swingable about a pivot 13. This locking lever 12 bears a locking member 14 which in the embodiment shown is developed as a bolt and in its active position cooperates with the bevels 10b of the incisions 10a (see FIG. 2).

While the crank pin 11 engages with a certain play into the incisions 10a of the control bar 10 since it merely effects the lateral movement of displacement of the color-change carriage 6, the engagement of the locking member 14 into the region of the incisions 10a which is provided with the bevels 10b results in an exact positioning of the control bar 10 and thus of the color-change carriage 6. This action is supported by a spring 15 which biases the locking lever 12 in the direction towards the control bar 10 and pulls the locking member 14 into the corresponding incision 10a. The dimensions of the locking member 14 and of the bevels 10b are so adapted to each other as to produce a self-locking action which, even when the color-change carriage 6 is urged in its direction of displacement, prevents unintended movement when the locking member 14 engages into a recess 10a.

In order to bring the color-change carriage 6 from the position shown in FIG. 2 into its next operating position, the disk 11a with the crank pin 11 is moved a complete revolution either in clockwise direction or in counterclockwise direction. As a result, the crank pin 11 passes into one of the incisions 10a and at the same time swings the locking lever 12 so that the locking member 14 is moved out of the range of action of the control bar 10 against the action of the spring 15. The turning movement of the disk 11a furthermore results in a displacement of the color-change carriage 6 by an amount corresponding to the distance between centers of the incisions 10a which is twice as great as the distance of the crank pin 11 from the axis of rotation of the disk 11a. As soon as the crank pin 11 emerges from the incision 10a the locking lever 12 is released and now descends under the force of the spring 15 and, due to its own weight, into the adjacent incision 10a and, by cooperating with the bevels 10b, assures an exact positioning of the control bar 10 and thus of the color-change carriage 6. In this new operating position the adjacent embroidery needle 4 is coupled with the needle-bar drive (17) of the corresponding embroidery head 2 so that now a yarn of different color or formation can be used for the embroidery process.

I claim:

1. A device for displacing a color-change carriage on multiple-head embroidery machines having in each case a plurality of embroidery needles per head which can be coupled selectively with a needle-bar drive for a change in color or thread, with needle-bar carriers of all of the embroidery heads being laterally displaceable jointly by a displacement bar which is connected with the color-change carriage, the improvement comprising a rack-like control bar formed with incisions is arranged on said color-change carriage, a servomotor, a crank pin is operatively drivingly connected to said servomotor, said crank pin engages from to time into one of said incisions of said control bar in an operative position, said crank pin in said operative position moving said control bar via said servomotor and thereby said color-change carriage, a locking lever having a locking member thereon cooperating from time to time with one of said incisions, and via the control bar, positioning the color-change carriage in a specific desired position, said crank pin constitutes means for swinging said locking lever when said crank pin engages into one of said incisions.

2. The device according to claim 1, wherein said crank pin and said locking member cooperate with the same said incisions in said control bar, respectively, from time to time.

3. The apparatus as set forth in claims 1 or 2, wherein said incisions are formed with widening funnel-shaped bevels, said locking member engages into said incisions at said bevels.

4. The apparatus according to claim 3, wherein said locking member constitutes a bolt, said bolt by means of said bevels constitutes means for providing an exact positioning setting of said control bar as well as a self-locking of said control bar against unintentional displacement.

5. The apparatus as set forth in claim 1, wherein said locking lever constitutes a double-armed lever mounted on said control bar, spring means for pulling said locking member into a corresponding of said incisions.

6. The apparatus as set forth in claim 1, wherein said servomotor is controllable as a function of a program of the embroidery machine.

7. The apparatus as set forth in claim 1, further comprising a crank disc rotatably mounted on said control bar and having said crank pin mounted thereon.

8. The apparatus as set forth in claim 1 or 5, wherein said bolt is automatically positioned in one of said incisions when said crank pin is out of engagement from said incisions.

9. The apparatus as set forth in claim 5, wherein said swinging of said locking lever by said crank pin when the latter engages into one of said incisions swings said locking lever counter to the force of said spring means and disengages said locking member from said incisions.

* * * * *